United States Patent
Kim et al.

(10) Patent No.: US 9,467,273 B2
(45) Date of Patent: Oct. 11, 2016

(54) APPARATUS AND METHOD FOR REDUCING INTER-CELL INTERFERENCE IN MULTIPLE INPUT MULTIPLE OUTPUT SYSTEM

(75) Inventors: Eun-Yong Kim, Hwaseong-si (KR); Yu-Seok Kim, Seoul (KR); Sang-Min Lee, Seoul (KR); Eun-Seok Ko, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 651 days.

(21) Appl. No.: 12/727,614

(22) Filed: Mar. 19, 2010

(65) Prior Publication Data

US 2010/0238889 A1    Sep. 23, 2010

(30) Foreign Application Priority Data

Mar. 20, 2009    (KR) .................. 10-2009-0024136

(51) Int. Cl.
*H04L 5/00* (2006.01)
*H04L 25/03* (2006.01)

(52) U.S. Cl.
CPC ....... *H04L 5/0091* (2013.01); *H04L 25/03343* (2013.01); *H04L 5/0023* (2013.01); *H04L 5/0037* (2013.01); *H04L 2025/03414* (2013.01); *H04L 2025/03426* (2013.01); *H04L 2025/03802* (2013.01)

(58) Field of Classification Search
USPC .................................................. 370/328–338
See application file for complete search history.

(56) References Cited

U.S. PATENT DOCUMENTS

| 2007/0174038 A1 | 7/2007 | Wang et al. |
| 2009/0129332 A1* | 5/2009 | Dayal et al. .................. 370/330 |
| 2011/0064036 A1* | 3/2011 | Tsai et al. ..................... 370/329 |
| 2012/0093093 A1* | 4/2012 | Frenger et al. ............... 370/329 |

FOREIGN PATENT DOCUMENTS

| CA | 2 516 910 A1 | 2/2007 |
| CN | 101292433 A | 10/2008 |
| CN | 101316156 A | 12/2008 |

OTHER PUBLICATIONS

Shkumbin Hamiti, The Draft IEEE 802.16m System Description Document, Apr. 30, 2008, Nokia.*
The Draft IEEE 802 .16m System Description Document. IEEE 802.16M-08/003R7, IEEE 802.16 Broadband Wireless Access Working Group, USA, vol. IEEE 802.16M-08/003R7. No. IEEE 802.16M-08/003R7, Feb. 7, 2009. pp. 1-171. XP008161571.*
"Proposed Text of M IMO for the IEEE 802.16m Amendment; C80216m-09_0513r2", IEEE Draft; C80216M-09_0513R2, IEEE-SA, Piscataway, NJ USA, vol. 802.16m, Mar. 11, 2009, pp. 1-36, D XP017611801.*

(Continued)

*Primary Examiner* — Hassan Phillips
*Assistant Examiner* — Omeed D Rahgozar
(74) *Attorney, Agent, or Firm* — Jefferson IP Law, LLP

(57) ABSTRACT

An apparatus and method for operating a Codebook Subset Pattern (CSP) of a Base Station (BS) in a Multiple Input Multiple Output (MIMO) system are provided. The method includes determining whether there is a CSP-updated BS among the BS and adjacent BSs, exchanging the updated CSP between cells if it is determined that there is a CSP-updated BS, and broadcasting the CSP of each cell acquired through the exchange thereby reducing an inter-cell interference in the MIMO system.

22 Claims, 9 Drawing Sheets

(56) References Cited

OTHER PUBLICATIONS

Shkumbi N Hamiti: "The Draft IEEE 802 .16m System Description Document. IEEE 802.16M-08/003R7", IEEE 802.16 Broadband Wireless Access Working Group, USA, vol. IEEE 802.16M-08/003R7. No. IEEE 802.16M-08/003R7, Feb. 7, 2009. pp. 1-171. XP008161571. Retrieved from the Internet:URL: http://ieee802.org/16/tgmjdocsj80216m-08 003r7.zip.

LG Electronics: "UE Measurement and Feedback for DL CoMP", 3GPP Draft; RI-091193 LGE Comp UE Measurement Feedback. 3rd Generation Partnership Project (3GPP). Mobile Competence Centre; 650, Route Des Lucioles; F-06921 Sophia-Antipolis Cedex; France. no. Seoul. Korea; Mar. 18, 2009. XP050338810.

Qualcomm Europe: "Signaling for spatial coordination in DL CoMP", A 3GPP Draft; R1-090867. 3rd Generation Partnership Project (3GPP). Mobile Competence Centre; 650. Route Des Lucioles; F-06921 Sophia-Antipolis Cedex; France. no. Athens. Greece; Feb. 4, 2009. XP050318716.

Samsung: "Further discussion on Inter-Cell Interference Mitigation through Limited Coordination", 3GPP Draft; R1-083569 Further Discussion on Comp, 3rd Generation Partnership Project (3GPP). Mobile Competence Centre; 650. Route Des Lucioles; F-06921 Sophia-Antipolis Cedex; France. no. Prague. Czech Republic; Sep. 25, 2008. XP050316931.

"Views on Coordinated Multipoint Transmission/Reception in LTE-Advanced", 3GPP Draft; R1-084252 Comp, 3rd Generation Partnership Project (3GPP). Mobile Competence Centre; 650. Route Des Lucioles; F-06921 Sophia-Antipolis Cedex; France. vol. RAN WG1. no. Prague. Czech Republic; Nov. 10, 2008-Nov. 14, 2008. Nov. 4, 2008. XP050597118.

Qualcomm Europe: "Impact of Downlink CoMP on the Air Interface", 3GPP Draft; R1-090366. 3rd Generation Partnership Project (3GPP). Mobile Competence Centre; 650. Route Desi Lucioles; F-06921 Sophia-Antipolis Cedex; France. no. Ljubljana; Jan. 8, 2009. XP050318270.

"Proposed Text of M IMO for the IEEE 802.16m Amendment ; C80216m-09_0513r2", IEEE Draft; C80216M-09_0513R2, IEEE-SA, Piscataway, NJ USA, vol. 802.16m, Mar. 11, 2009, pp. 1-36, XP017611801.

\* cited by examiner

| | CODEBOOK SUBSET |
|---|---|
| ▓ | $\{V_1, V_2, V_3, V_4\}$ |
| ▒ | $\{V_1, V_2\}$ |
| ░ | $\{V_3, V_4\}$ |
| □ | $\{V_2, V_3, V_4\}$ |

- $\{V_1, V_2, V_3, V_4\}$ — SUPERSET
- $\{V_1, V_2\}$, $\{V_3, V_4\}$, $\{V_2, V_3, V_4\}$ — SUBSET

FIG.2

APPARATUS AND METHOD FOR REDUCING INTER-CELL INTERFERENCE IN MULTIPLE INPUT MULTIPLE OUTPUT SYSTEM

This application claims the benefit under 35 U.S.C. §119(a) of a Korean patent application filed in the Korean Intellectual Property Office on Mar. 20, 2009 and assigned Ser. No. 10-2009-0024136, the entire disclosure of which is hereby incorporated by reference.

BACKGROUND OF THE INVENTION

1. Field of the Invention

The present invention relates to a Multiple Input Multiple Output (MIMO) system. More particularly, the present invention relates to an apparatus and method for reducing an inter-cell interference in a MIMO system.

2. Description of the Related Art

Recently, research on a technique for controlling an inter-cell interference through inter-Base Station (BS) coordination has been conducted. The inter-BS coordination technique is called Coordinated Multiple Point Transmission/Reception (CoMP) in the $3^{rd}$ Generation Partnership Project (3GPP) Long Term Evolution-Advanced (LTE-A) standard and is called Multi-cell Multiple Input Multiple Output (MIMO) in the Institute of Electrical and Electronics Engineers (IEEE) standard 802.16m. Although the following description is given of the CoMP technique with reference to the 3GPP standardization group, it is also applicable to the multi-cell MIMO technique of the IEEE standard 802.16m.

The CoMP technique is divided into a Coordinated scheduling and/or Beamforming (CB) technique and a Joint Processing/transmission (JP) technique. Similar to a conventional single-cell MIMO technique, the CB technique transmits traffic data for one User Equipment (UE) from one transmitting node (i.e., a BS or a cell). Thus, the CB technique does not require inter-cell packet sharing and cannot use a Signal-to-Noise Ratio (SNR) enhancement technique. On the other hand, the JP technique transmits traffic data for one UE from two or more transmitting nodes. Thus, the JP technique can enhance an SNR by means of the SNR enhancement technique and requires inter-cell packet sharing.

An example of the CB technique is a Precoding Matrix Information (PMI) restriction technique. In the PMI restriction technique, a UE located at a cell boundary requests a serving BS to prevent a precoding vector from being used by an adjacent BS if the UE receives a strong interference from an adjacent cell due to the use of a precoder between adjacent cells. The adjacent BS does not use the precoding vector according to the request. Accordingly, the inter-cell interference decreases and thus the PMI restriction technique can enhance an SNR.

Examples of the JP technique include a Macro diversity technique and a multi-cell Zero-Forcing BeamForming (ZFBF) technique. The macro diversity technique transmits traffic data from multiple cells to only one UE. The macro diversity technique has poor frequency efficiency. However, because the macro diversity technique uses an interference channel as an effective signal channel, it can reduce the interference and increase the signal strength. The multi-cell ZFBF technique transmits traffic data from multiple cells to multiple UEs simultaneously and uses downlink channel information to reduce the interference between the UEs. The multi-cell ZFBF technique is very similar to a single-cell ZFBF technique. However, due to an addition of a backhaul and a multi-cell concept, the multi-cell ZFBF technique is difficult to implement and its throughput may depend on the backhaul characteristics.

As described above, the CoMP technique increases the system complexity and cannot secure performance improvement in an actual system. More specifically, the CoMP technique has the following three problems.

Firstly, the CoMP technique is problematic in terms of system operation. A conventional CoMP technique requires a fast operation in comparison with the conventional single-cell MIMO technique. For example, the CoMP technique must select target UEs and manage the selected UEs in a separate manner, which increases the complexity of a scheduler and reduces resource utilization efficiency. Also, except for the macro diversity technique, the CoMP is applicable only to a closed-loop MIMO technique. Therefore, a moving UE cannot benefit from noise reduction.

Secondly, if the conventional CoMP technique is applied to the system, cells participating in a coordination must be grouped into clusters for scheduling and transmission. In this case, because the number of cells included in a cluster is restricted, only a portion of a multi-cell interference can be controlled. Thus, although the conventional CoMP technique is applied, the throughput may be restricted by the interferences between uncontrolled remaining cells, which are received from outside of the cell cluster. Also, there is an increased probability that scheduling complexity may increase due to a cluster-by-cluster multi-cell scheduling.

Thirdly, the CoMP technique has a throughput restriction problem due to a backhaul. The conventional CoMP technique must exchange coordination information through backhaul for inter-BS coordination. In this case, the coordination level can increase according to the amount of exchanged coordination information, but the throughput may degrade due to the time delay taken for an inter-BS information exchange. Similarly, the conventional CoMP technique requires a high backhaul overhead and is very sensitive to backhaul latency. Therefore, improvement of the throughput versus the overhead may be small if there is not a good backhaul.

Therefore, a need exists for an apparatus and method for reducing an inter-cell interference while having low scheduling complexity and low backhaul dependence.

SUMMARY OF THE INVENTION

An aspect of the present invention is to address at least the above-mentioned problems and/or disadvantages and to provide at least the advantages described below. Accordingly, an aspect of the present invention is to provide an apparatus and method for reducing an inter-cell interference in a Multi-cell Multiple Input Multiple Output (MIMO) system.

Another aspect of the present invention is to provide an apparatus and method for efficiently reducing an inter-cell interference in a MIMO system while having low scheduling complexity and low backhaul dependence.

Still another aspect of the present invention is to provide an apparatus and method for operating a codebook to reduce an inter-cell interference in a MIMO system.

A further aspect of the present invention is to provide an apparatus and method for exchanging a Codebook Subset Pattern (CSP) between cells and broadcasting the inter-cell CSP in a MIMO system.

Another aspect of the present invention is to provide an apparatus and method for each cell to adaptively update a CSP in a MIMO system.

Still another aspect of the present invention is to provide an apparatus and method for each cell to transmit a CSP update request to an adjacent cell and receive an ACKnowledge (ACK)/Non-ACKnowledge (NACK) message for the CSP update request from the adjacent cell in a MIMO system.

In accordance with an aspect of the present invention, a method for operating a CSP of a Base Station (BS) in a MIMO system is provided. The method includes determining whether there is a CSP-updated BS among the BS and adjacent BSs, exchanging the updated CSP between cells if it is determined that there is a CSP-updated BS, and broadcasting the CSP of each cell acquired through the exchange.

In accordance with another aspect of the present invention, an apparatus for operating a CSP of a BS in a MIMO system is provided. The apparatus includes a CSP updater for determining whether there is a CSP-updated BS among the BS and adjacent BSs, an inter-cell information exchanger for exchanging the updated CSP between cells if it is determined that there is a CSP-updated BS, and a signal transmitter for broadcasting the CSP of each cell acquired through the exchange.

In accordance with still another aspect of the present invention, a method for reporting a Channel Quality Indicator (CQI) of a User Equipment (UE) in a MIMO system is provided. The method includes receiving a CSP of each of a plurality of cells, receiving a Common Reference Signal (CRS) from each cell, determining a multi-cell CQI based on the received CSP and CRS of each cell, and reporting the determined multi-cell CQI to a BS.

In accordance with a further aspect of the present invention, an apparatus for reporting a CQI of a UE in a MIMO system is provided. The apparatus includes a signal receiver for receiving a CSP of each of a plurality of cells and for receiving a CRS from each cell, and a feedback information generator for determining a multi-cell CQI based on the received CSP and CRS of each cell and for reporting the determined multi-cell CQI to a BS.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 2 is a diagram illustrating an example of a codebook subset table according to an exemplary embodiment of the present invention;

Throughout the drawings, like reference numerals will be understood to refer to like parts, components, and structures.

DETAILED DESCRIPTION OF THE EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide Exemplary embodiments of the present invention provide an apparatus and method for operating a codebook to reduce an inter-cell interference in a Multiple Input Multiple Output (MIMO) system.

A conventional system uses one codebook defined according to the number of antennas regardless of cells and resources. In an exemplary implementation, different codebooks according to cells and resources (time/frequency) are used. Accordingly, a codebook structure for each of predefined time/frequency resources will be referred to as a Codebook Subset Pattern (CSP). Each cell uses one CSP and transmits DownLink (DL) data through a codebook for each time/frequency resource. Herein, the codebook may be an empty set or a set of one or more precoding vectors and the precoding vector may be a vector representing a data precoding rule. Herein, the codebook being an empty set denotes that the corresponding time/frequency resource is not used for data transmission, which may be used to reliably prevent an interference with an adjacent cell.

Figure 1:
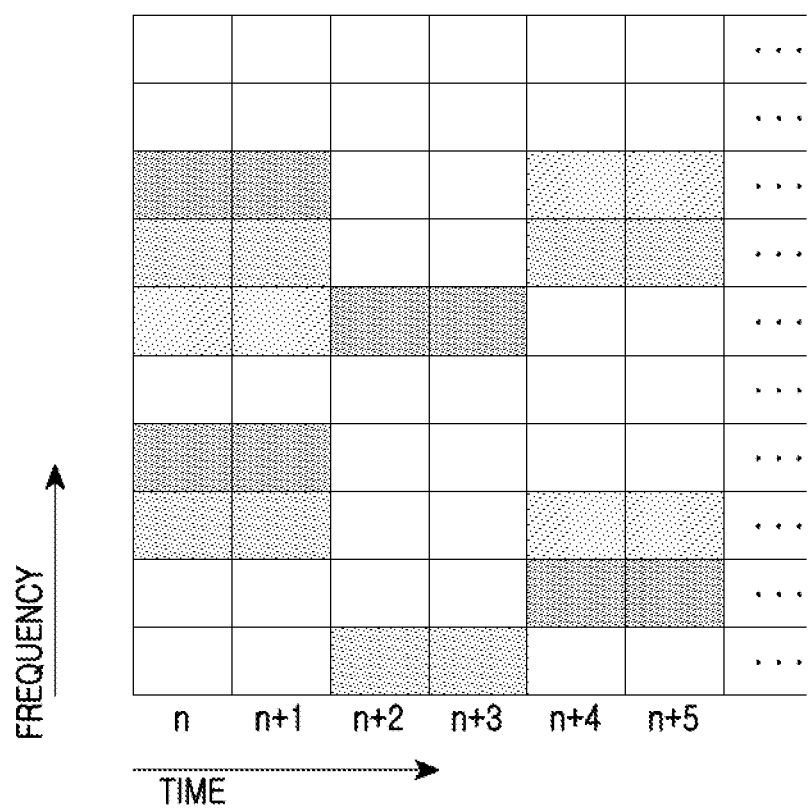
FIG. 1 is a diagram illustrating an example of a Codebook Subset Pattern (CSP) according to an exemplary embodiment of the present invention.

FIG. 1 is a diagram illustrating an example of a CSP according to an exemplary embodiment of the present invention.

Referring to FIG. 1, a horizontal axis of a CSP represents a time (i.e., a subframe) and a vertical axis represents a frequency (i.e., a Resource Block (RB) or a subband). The CSP represents a color or pattern corresponding to a codebook to be used for each time/frequency resource. In an exemplary implementation, the pattern is used to represent a codebook to be used for each resource in the CSP. Herein, the representation of one or more precoding vectors constituting a codebook corresponding to each color or pattern will be referred to as a codebook subset table.

FIG. 2 is a diagram illustrating an example of a codebook subset table according to an exemplary embodiment of the present invention.

Referring to FIG. 2, the codebook subset table represents one or more precoding vectors constituting a codebook corresponding to each pattern (or color).

The codebook subset table includes supersets and subsets. Herein, the superset is a precoding vector set of a codebook including all possible precoding vectors in one codebook. The subset is a precoding vector set of a codebook including some of the possible precoding vectors in one codebook. In FIG. 2, $v_n$ denotes the $n^{th}$ element of a superset codebook, i.e., the $n^{th}$ precoding vector.

For example, if all possible precoding vectors in one codebook are $v_1$, $v_2$, $v_3$ and $v_4$, a precoding vector set $\{v_1, v_2, v_3, v_4\}$ corresponds to a pattern (or color) corresponding to the superset in the codebook subset table. For example, restricted precoding vector sets $\{v_1, v_2\}$, $\{v_3, v_4\}$ and $\{v_2, v_3, v_4\}$ may correspond to a pattern (or color) corresponding to the subset. Herein, the precoding vector set being $\{v_1, v_2\}$ denotes that only the $v_1$ and $v_2$ among the $v_1$, $v_2$, $v_3$ and $v_4$ are used to precode data to be transmitted to a User Equipment (UE), which guarantees that an interference due to $\{v_3, v_4\}$ will not be transmitted to an adjacent cell.

Although FIG. 2 illustrates that the codebook subset table includes one superset and a plurality of subsets, the present invention is not limited thereto. For example, the codebook subset table may further include an empty subset with an empty precoding vector set.

Figure 3:
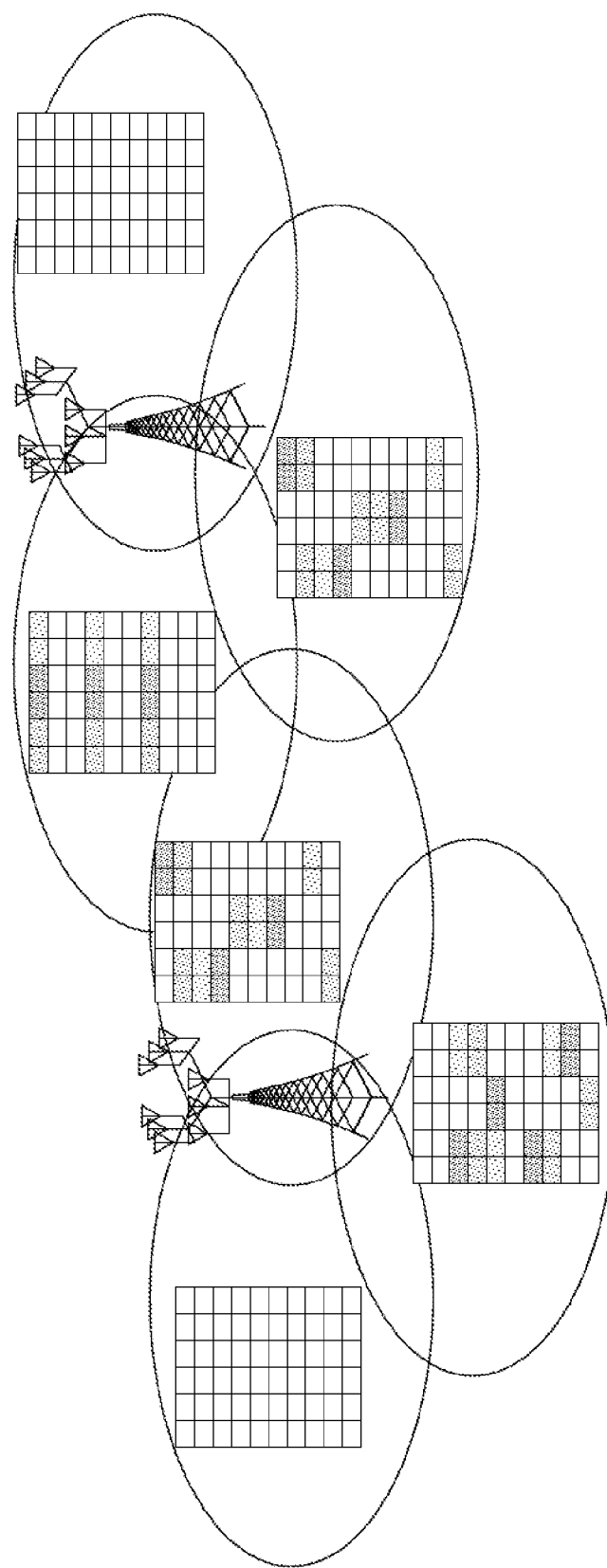
FIG. 3 is a diagram illustrating an example where each of a plurality of cells uses one CSP according to an exemplary embodiment of the present invention.

FIG. 3 is a diagram illustrating an example where each of a plurality of cells uses one CSP according to an exemplary embodiment of the present invention.

Referring to FIG. 3, each cell has one CSP and a codebook used for each resource in the cell is represented by a pattern (or color) in the CSP. If one CSP includes more patterns (or colors) corresponding to a superset and fewer patterns (or colors) corresponding to a subset, that is, if the cell has more resources using a superset codebook and fewer resources using a subset codebook, it is advantageous to the throughput of the cell due to a high scheduling gain in a spatial domain but increases the probability that the UEs of an adjacent cell (more particularly, the edge UEs of an adjacent cell) may receive a strong interference. Thus, in order to effectively manage an intra-cell UE distribution change and a service type for a UE, it is necessary to control a ratio of patterns (or colors) corresponding to a subset to patterns (or colors) corresponding to a superset in the CSP of each cell. Accordingly, a serving BS of the UE transmits a CSP update request to a BS of an adjacent cell (i.e., an adjacent BS), and the adjacent BS updates a CSP in response to the CSP update request and transmits information regarding the updated CSP to the serving BS.

Herein, a CSP of each cell may be randomly selected or updated, or may be adaptively selected or updated using feedback information from a UE (e.g., a Channel Quality Indicator (CQI) and an ACKnowledge (ACK)/Non-ACKnowledge (NACK) ratio) or a downlink throughput Cumulative Density Function (CDF). Also, the CSP update may be requested by transmitting the cell loading conditions between adjacent cells or a CSP exchange request message through a backhaul. The CSP may be determined by the upper network or BSs. Hereinafter, a description will be given of a method for updating a CSP by using a downlink throughput CDF according to an exemplary embodiment of the present invention.

Figure 4:
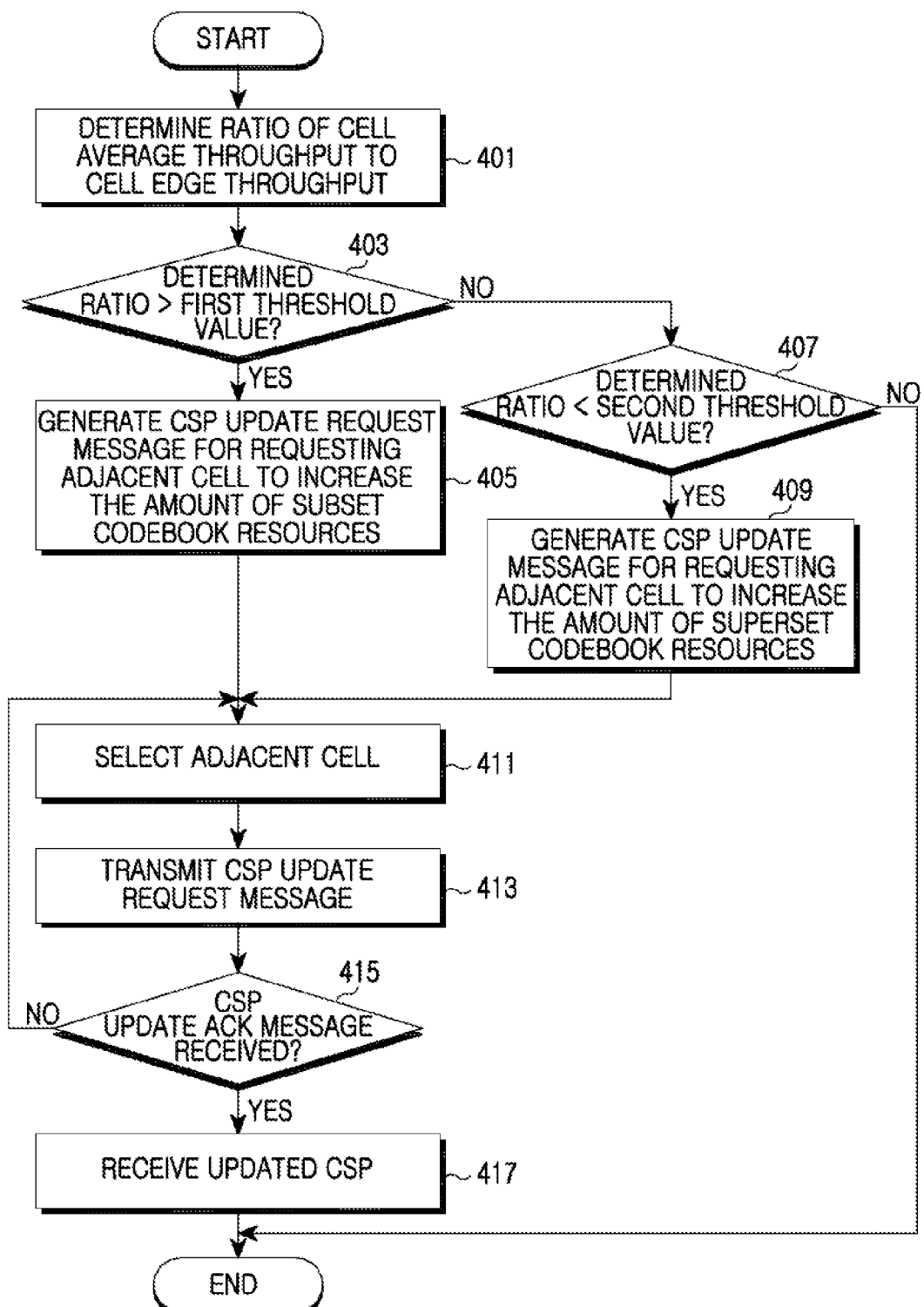
FIG. 4 is a flowchart illustrating a method for a serving Base Station (BS) to transmit a CSP update request to a BS of an adjacent cell (i.e., an adjacent BS or an adjacent sector) and receive information regarding the updated CSP from the adjacent BS according to an exemplary embodiment of the present invention.
Figure 5:
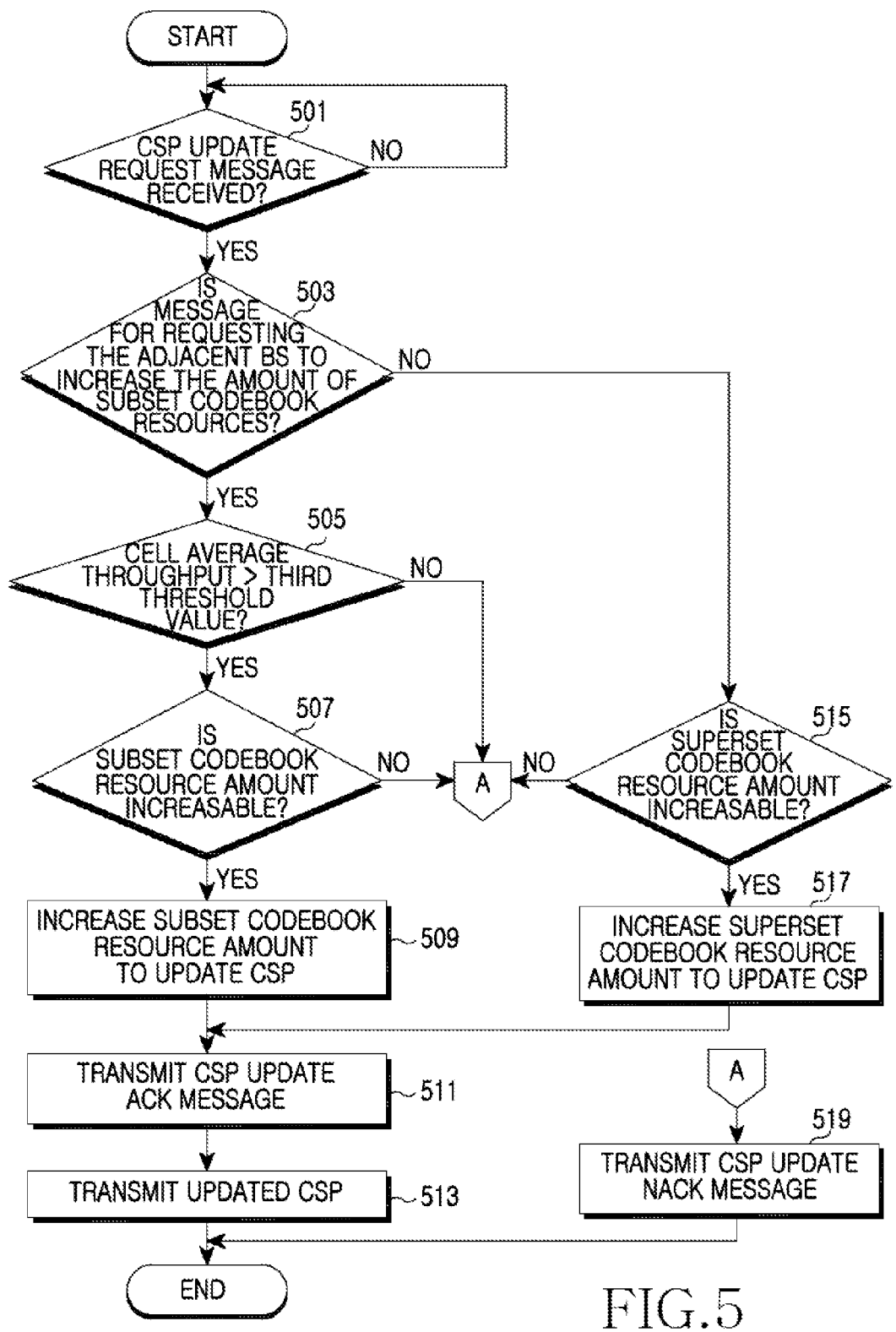
FIG. 5 is a flowchart illustrating a method for a BS of an adjacent cell (i.e., an adjacent BS or an adjacent sector) to update a CSP in response to a CSP update request of a serving BS and transmit information regarding the updated CSP to the serving BS in a MIMO system, according to an exemplary embodiment of the present invention.

FIGS. 4 and 5 illustrate a method for updating a CSP and exchanging information regarding the updated CSP between cells in order to effectively manage an intra-cell UE distribution change and a service type for a UE.

FIG. 4 is a flowchart illustrating a method for a serving BS to transmit a CSP update request to a BS of an adjacent cell (i.e., an adjacent BS or an adjacent sector) and receive information regarding the updated CSP from the adjacent BS in order to reduce an inter-cell interference in a MIMO system, according to an exemplary embodiment of the present invention.

Referring to FIG. 4, in step 401, a serving BS uses a downlink throughput CDF to determine a ratio of a cell average throughput to the cell edge throughput. Herein, the throughput may be defined by a data rate (bps/Hz). For example, in the $3^{rd}$ Generation Partnership Project (3GPP) Long Term Evolution (LTE) or the Institute of Electrical and Electronics Engineers (IEEE) standard 802.16m system, the cell edge throughput may be defined by a 5% point of the CDF.

In step 403, the serving BS determines whether the determined ratio is greater than a first threshold value.

If it is determined that the ratio is greater than the first threshold value, the serving BS determines that the cell edge throughput is lower than an allowable value due to an inter-cell interference influence and proceeds to step 405. In step 405, the serving BS generates a CSP update request message for requesting an adjacent cell to increase the amount of subset codebook resources in order to reduce an inter-cell interference received from the adjacent cell.

On the other hand, if it is determined that the ratio is not greater than the first threshold value, the serving BS proceeds to step 407. In step 407, the serving BS determines whether the determined ratio is smaller than a second threshold value. Herein, the second threshold value is set to be smaller than the first threshold value, and the first threshold value and the second threshold value are determined according to an intra-call UE distribution and a service type of a UE.

If it is determined that the ratio is smaller than the second threshold value, the serving BS determines that the cell edge throughput is higher than the allowable value due to little influence of an inter-cell interference and proceeds to step

409. In step 409, the serving BS generates a CSP update request message for requesting an adjacent cell to increase an amount of superset codebook resources.

On the other hand, if it is determined that the ratio is not smaller than the second threshold value, the serving BS determines that a CSP update is unnecessary and ends the algorithm.

In step 411, the serving BS selects one of a plurality of adjacent cells, to which the generated CSP update request message is to be transmitted. In step 413, the serving BS transmits the generated CSP update request message to a BS of the selected adjacent cell (i.e., an adjacent BS).

In step 415, the serving BS determines whether a CSP update ACK message is received from the adjacent BS. If it is determined that the CSP update ACK message is received from the adjacent BS, the serving BS proceeds to step 417. In step 417, the serving BS receives an updated CSP from the adjacent BS. Herein, the updated CSP is received through a backhaul and a cell identifier is received together with the updated CSP. Also, information regarding the application time of the updated CSP and the number of antennas of the adjacent BS may be received together with the updated CSP. Herein, in the case of LTE, the application time of the updated CSP may be represented using a System Frame Number (SFN). On the other hand, if a CSP update NACK message is received from the adjacent BS, or if the CSP update ACK message or the CSP update NACK message is not received from the adjacent BS within a preset time, the serving BS returns to step 411. In step 411, the serving BS selects one of the adjacent cells other than the adjacent cell that transmitted a CSP update NACK message.

Thereafter, the serving BS ends the algorithm.

FIG. 5 is a flowchart illustrating a method for a BS of an adjacent cell (i.e., an adjacent BS or an adjacent sector) to update a CSP in response to a CSP update request of a serving BS and transmit information regarding the updated CSP to the serving BS in a MIMO system, according to an exemplary embodiment of the present invention.

Referring to FIG. 5, in step 501, an adjacent BS determines whether a CSP update request message is received from a serving BS of a UE. Herein, the CSP update request message requests the adjacent BS to increase the amount of subset codebook resources or the amount of superset codebook resources.

If the CSP update request message is received from the serving BS, the adjacent BS proceeds to step 503. In step 503, the adjacent BS determines whether the received CSP update request message is a message for requesting the adjacent BS to increase the amount of subset codebook resources.

If it is determined that the received CSP update request message is a message for requesting the adjacent BS to increase the amount of subset codebook resources, the adjacent BS proceeds to step 505. In step 505, the adjacent BS determines whether the cell average throughput is higher than a third threshold value.

If the adjacent BS determines that the cell average throughput is higher than the third threshold value, the adjacent BS determines that there will be no serious performance problem even in the event of decreasing the amount of superset codebook resources in the current CSP and proceeds to step 507. In step 507, the adjacent BS determines whether the amount of subset codebook resources can be increased. Herein, whether the amount of subset codebook resources can be increased may be determined according to whether there is at least one superset codebook resource in the current CSP that can be changed to use a subset codebook. In an exemplary implementation, whether the amount of subset codebook resources can be increased may be determined according to whether there is a CSP that has a higher subset codebook ratio than the current CSP among the CSPs designated in the system.

If it is determined that the amount of subset codebook resources can be increased, the adjacent BS proceeds to step 509. In step 509, the adjacent BS increases the amount of subset codebook resources in a CSP to update the CSP. That is, in an exemplary implementation, a change is made to use a subset codebook for the superset codebook resources in the current CSP within a possible range. In another exemplary implementation, a change is made to use a CSP that has a higher subset codebook ratio than the current CSP among the CSPs designated in the system.

In step 511, the adjacent BS transmits a CSP update ACK message to the serving BS. In step 513, the adjacent BS transmits the updated CSP to the serving BS. Herein, the updated CSP is transmitted through a backhaul and a cell identifier is transmitted together with the updated CSP. Also, information regarding an application time of the updated CSP and a number of antennas of the adjacent BS may be transmitted together with the updated CSP. Herein, in the case of LTE, the application time of the updated CSP may be represented using an SFN. On the other hand, if the cell average throughput is not higher than the third threshold value or if the amount of subset codebook resources cannot be increased, the adjacent BS proceeds to step 519. In step 519, the adjacent BS transmits a CSP update NACK message to the serving BS. Thereafter, the adjacent BS ends the algorithm.

On the other hand, if the received CSP update request message is a message for requesting the adjacent BS to increase the amount of superset codebook resources, the adjacent BS proceeds to step 515. In step 515, the adjacent BS determines whether the amount of superset codebook resources can be increased. Herein, in an exemplary implementation, whether the amount of superset codebook resources can be increased may be determined according to whether there is at least one subset codebook resource in the current CSP that can be changed to use a superset codebook. In another exemplary implementation, whether the amount of superset codebook resources can be increased may be determined according to whether there is a CSP that has a higher superset codebook resource ratio than the current CSP among the CSPs designated in the system.

If it is determined that the amount of superset codebook resources can be increased, the adjacent BS proceeds to step 517. In step 517, the adjacent BS increases the amount of superset codebook resources in a CSP to update the CSP. That is, in an exemplary implementation, a change is made to use a superset codebook for the subset codebook resources in the current CSP within a possible range. In another exemplary implementation, a change is made to use a CSP that has a higher superset codebook resource ratio than the current CSP among the CSPs designated in the system. Thereafter, the adjacent BS returns to step 511.

On the other hand, if the amount of superset codebook resources cannot be increased, the adjacent BS proceeds to step 519. In step 519, the adjacent BS transmits a CSP update NACK message to the serving BS. Thereafter, the adjacent BS ends the algorithm.

As described above, exemplary embodiments of the present invention update a CSP of each cell and exchange the updated CSP between cells. The CSP exchanged between cells is broadcast to the UEs of the corresponding cell. An intra-cell UE determines a multi-cell CQI through a CSP for each cell based on an inter-cell interference and transmits the determined multi-cell CQI to the serving BS. Upon receiving the determined multi-cell CQI, the serving BS performs a scheduling operation based on the received multi-cell CQI. The multi-cell CQI is determined based on an inter-cell interference that is estimated through not only a codebook and a channel matrix received from the serving BS but also a codebook and a channel matrix received from adjacent BSs.

Figure 6:
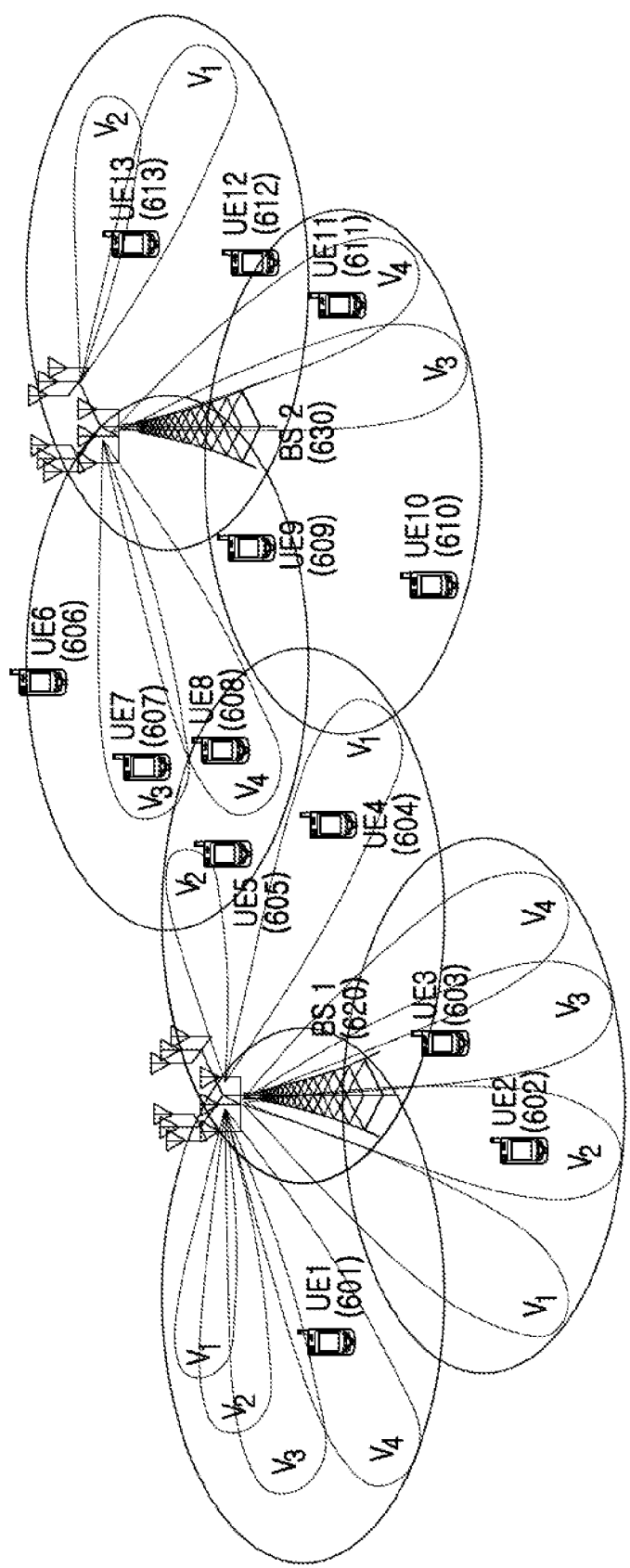
FIG. 6 is a diagram illustrating an example where each of a plurality of cells use a CSP to schedule a User Equipment (UE) according to an exemplary embodiment of the present invention.

FIG. 6 is a diagram illustrating an example where each of a plurality of cells uses a CSP to schedule a UE according to an exemplary embodiment of the present invention.

Referring to FIG. 6, if a different codebook is used for each cell with respect to given time/frequency resources according to an exemplary embodiment of the present invention, UEs with high estimated SNR and inter-cell interference (such as, UE1 601, UE2 602, UE4 604, UE8 608, UE11 611 and UE13 613 have a better multi-cell CQI. Thus, it is advantageous to allocate resources through scheduling from the corresponding BSs 620 and 630.

Figure 7:
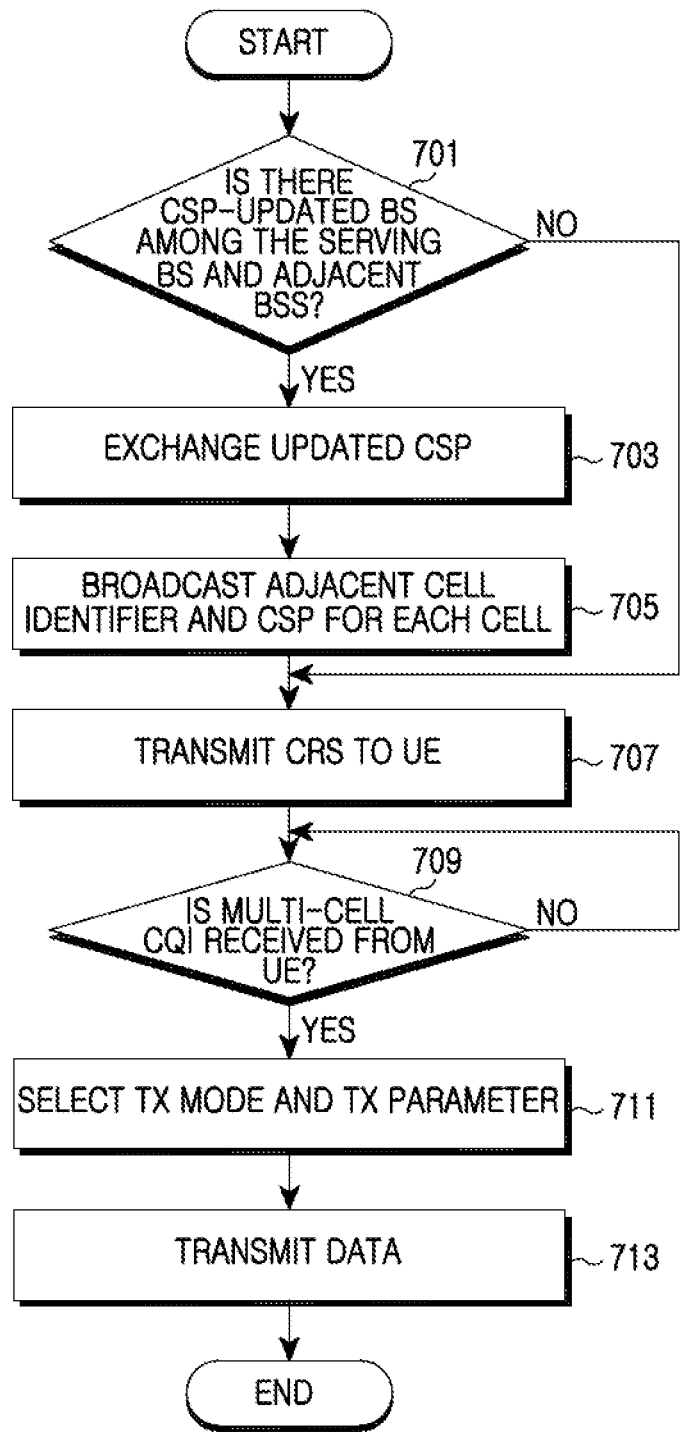
FIG. 7 is a flowchart illustrating a data transmitting method of a serving BS in a MIMO system according to an exemplary embodiment of the present invention.

FIG. 7 is a flowchart illustrating a data transmitting method of a serving BS in a MIMO system according to an exemplary embodiment of the present invention.

Referring to FIG. 7, in step 701, a serving BS determines whether there is a CSP-updated BS among the serving BS and adjacent BSs. If it is determined that there is no CSP-updated BS among the serving BS and adjacent BSs, the serving BS proceeds directly to step 707.

On the other hand, if it is determined that there is a CSP-updated BS among the serving BS and adjacent BSs, the serving BS proceeds to step 703. In step 703, the serving BS exchanges the updated CSP with an adjacent cell. Herein, the updated CSP is exchanged through a backhaul and a cell identifier is exchanged together with the updated CSP. Also, information regarding an application time of the updated CSP and a number of antennas of the adjacent BS may be exchanged together with the updated CSP. Herein, in the case of LTE, the application time of the updated CSP may be represented using an SFN. Accordingly, a BS of each cell acquires its own CSP, and an adjacent cell identifier and a CSP of adjacent cells.

In step 705, the serving BS broadcasts the adjacent cell identifier and the CSP for each cell, which are acquired through the exchange, to intra-cell UEs. The inter-cell CSP exchange and the broadcast to the UEs must be performed whenever the CSP is updated. Herein, application time of a new CSP is notified by an SFN, and the CSP is sufficiently exchanged before the application time based on a backhaul latency (e.g., up to 20 msec for X2) and the time taken for broadcast to a UE. Also, in order to reduce the amount of information necessary to represent the CSP, only an index may be exchanged by setting a main CSP.

In step 707, the serving BS transmits a Common Reference Signal (CRS) for channel estimation and a CQI measurement to intra-cell UEs. The following description illustrates a CRS for 3GPP. However, in the case of the IEEE standard 802.16m, a common pilot signal, such as a preamble/midamble may be transmitted to the UE.

In step 709, the serving BS determines whether a multi-cell CQI is received from an intra-cell UE. Herein, each intra-cell UE determines a multi-cell CQI based on an inter-cell interference by using the adjacent cell identifier and the CSP for each cell received from the serving BS and the CRS received from the serving cell and the adjacent cell. Also, each intra-cell transmits the determined multi-cell CQI to the serving BS.

In step 711, upon receiving the multi-cell CQI from the intra-cell UE, the serving BS uses the received multi-cell CQI to allocate each resource a UE, to which data will be transmitted, and select Transmission (TX) parameters and a TX mode of the corresponding UE. Herein, some of the resources may not be allocated a UE to which data will be transmitted. For example, the TX mode may be one of a Single User MIMO (SU-MIMO) mode such as Spatial Division Multiplexing (SDM) and a Multi User MIMO (MU-MIMO) mode such as Spatial Division Multiple Access (SDMA). Herein, the TX parameters may include a TX stream, a subchannel, a precoding vector, a rank, a Modulation and Coding Selection (MCS) level and the like.

In step 713, the serving BS uses the selected TX mode and TX parameters to transmit data. Thereafter, the serving BS ends the algorithm.

Figure 8:
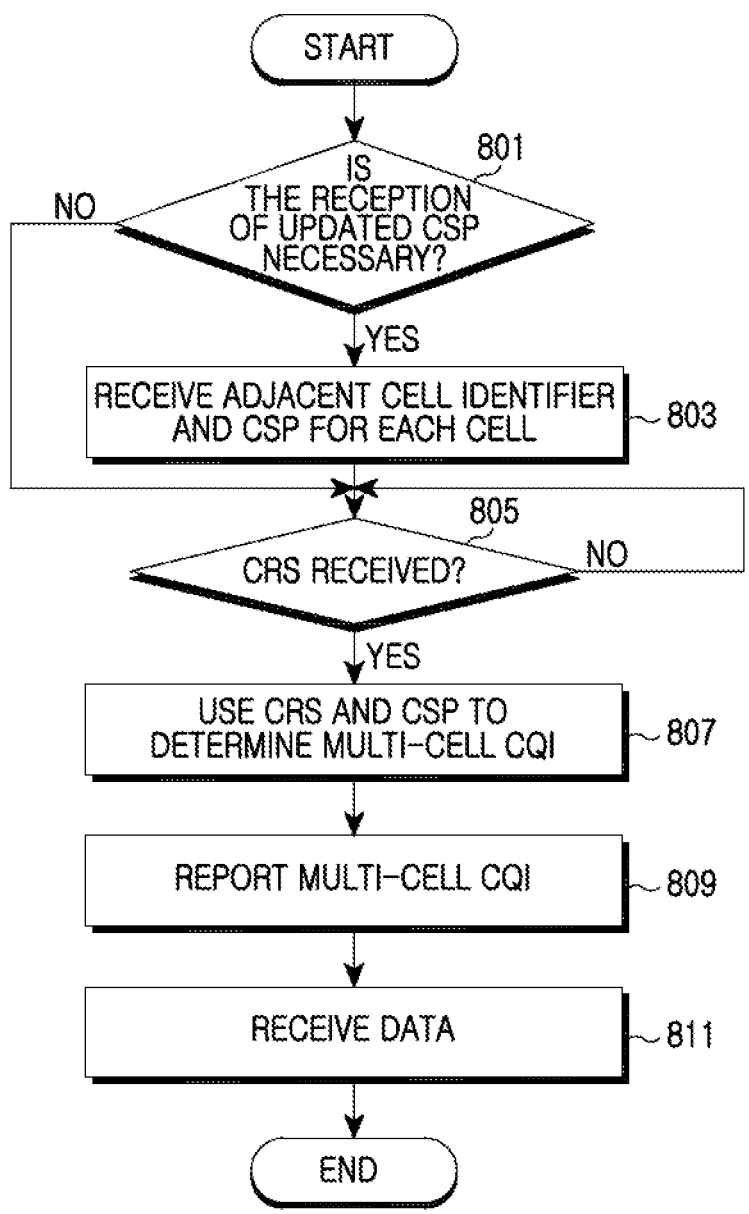
FIG. 8 is a flowchart illustrating a data receiving method of a UE in a MIMO system according to an exemplary embodiment of the present invention.

FIG. 8 is a flowchart illustrating a data receiving method of a UE in a MIMO system according to an exemplary embodiment of the present invention.

Referring to FIG. 8, in step 801, a UE determines whether the reception of an updated CSP is necessary. If it is determined that the reception of an updated CSP is not necessary, the UE proceeds directly to step 805. On the other hand, if it is determined that the reception of an updated CSP is necessary, the UE proceeds to step 803. In step 803, the UE receives an adjacent cell identifier and a CSP for each cell from a serving BS.

In step 805, the UE determines whether a CRS is received from the serving cell and the adjacent cell. If it is determined that a CRS is received from the serving cell and the adjacent cell, the UE proceeds to step 807. In step 807, the UE determines a multi-cell CQI based on an inter-cell interference by using the adjacent cell identifier and the CSP for each cell received from the serving BS and the CRS received from the serving cell and the adjacent cell.

Herein, the multi-cell CQI is determined as follows. A BS of each cell multiplies a CRS signal, which is used to estimate a channel undergone by a TX signal of the corresponding cell, by a scrambling sequence allocated to each cell and transmits the scrambled CRS signal to a UE. Herein, the UE may use the cell identifiers of the adjacent cells and the serving cell to extract the scrambling sequence allocated to each cell. Also, the UE extracts a signal of the CRS-allocated resource from a Reception (RX) signal, descrambles the extracted signal by the allocated scrambling sequence to acquire a CRS signal of each cell, and uses the acquired CRS signal to determine a channel estimation value of each cell. Also, the UE uses the CSP of the adjacent cell and the serving cell to search a codebook of the adjacent cells and the serving cell corresponding to each time/frequency resource, and uses the channel estimation value of each cell to measure elements of the codebook searched for each cell, i.e., the multi-cell CQI corresponding to each precoding vector.

In step 809, the UE transmits the determined multi-cell CQI to the serving BS. In step 811, the UE receives data from the serving BS according to the scheduling performed by the serving BS based on the multi-cell CQI received from intra-cell UEs.

Thereafter, the UE ends the algorithm.

As described above, in an exemplary embodiment of the present invention, the UE determines a multi-cell CQI through a CSP update and inter-cell CSP exchange to perform a scheduling operation, thus giving an inter-cell interference reduction effect to all the UEs in the cell. Herein, it should be noted that the multi-cell CQIs of adjacent cells become different if some cell does not use a codebook designated in a CSP. Accordingly, the following scheduling restrictions are required. Because transmission schemes using a codebook based on 3GPP, such as open-loop Spatial Multiplexing (SM), closed-loop SM, multi-user MIMO and closed-loop rank=1 precoding, use a codebook designated in a CSP, the transmission schemes may be used in any time/frequency resource. However, because transmission schemes not using a codebook, such as a single-antenna port (port 0), transmit diversity and a single-antennal port (port 5), do not use a codebook designated in a CSP, the transmission schemes may be used in a time/frequency resource allocated a superset codebook in a CSP.

Figure 9:
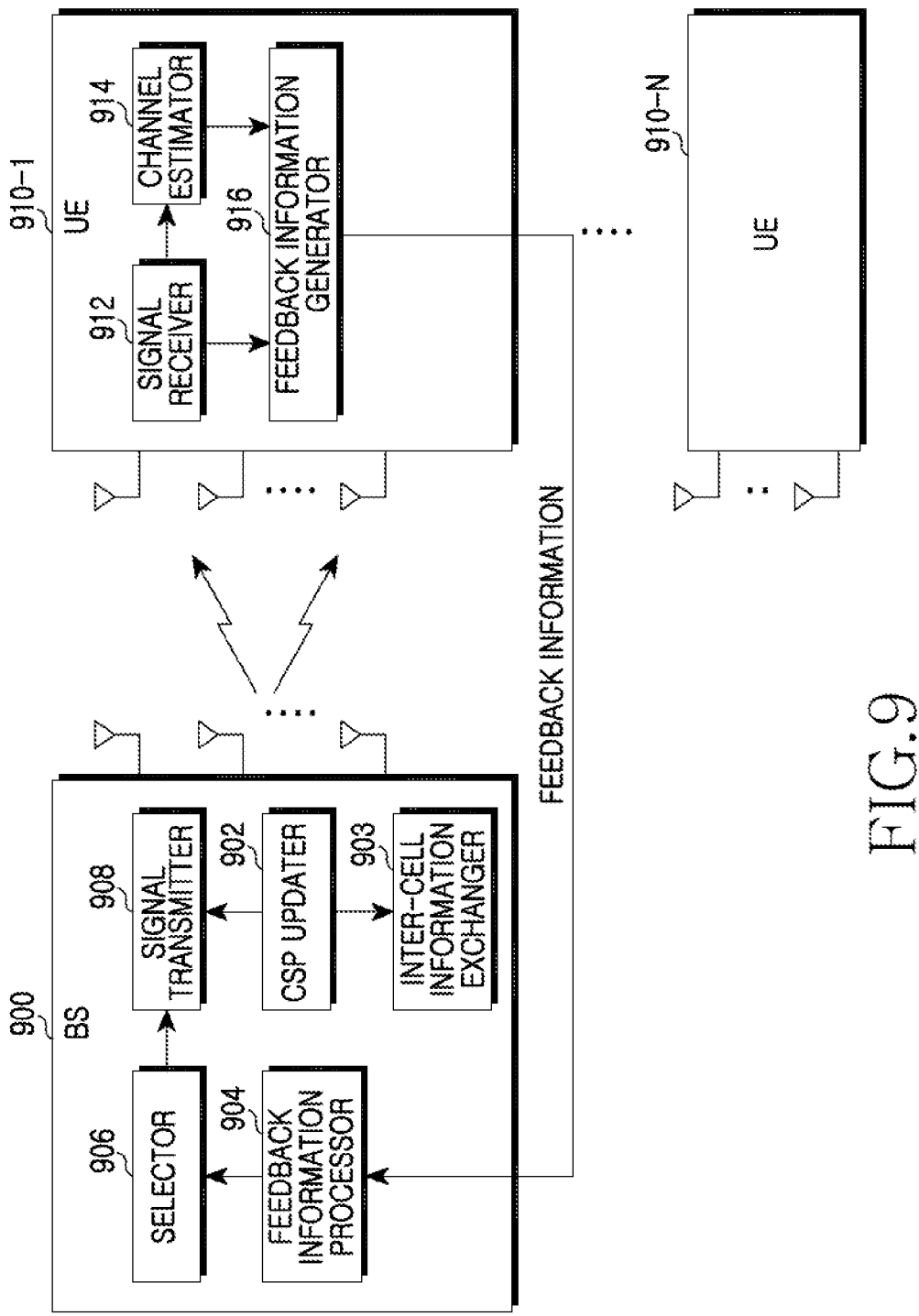
FIG. 9 is a diagram illustrating a cell structure in a MIMO system according to an exemplary embodiment of the present invention.

FIG. 9 is a diagram illustrating a cell structure in a MIMO system according to an exemplary embodiment of the present invention.

Referring to FIG. 9, a BS 900 includes a CSP updater 902, an inter-cell information exchanger 903, a feedback information processor 904, a selector 906, and a signal transmitter 908. Each of a plurality of UEs 910-1~910-N in a cell includes a signal receiver 912, a channel estimator 914, and a feedback information generator 916.

Regarding the BS 900, the CSP updater 902 determines the ratio of the cell average throughput to the cell edge throughput, compares the determined ratio with a preset threshold value to generate a CSP update request message for requesting the update of the amount of subset codebook resources and the amount of superset codebook resources, and transmits the generated CSP update request message through the inter-cell information exchanger 903 to an adjacent cell. Herein, the CSP updater 902 may receive a CSP update ACK message or a CSP update NACK message, which indicates the possibility of a CSP update, from the adjacent cell through the inter-cell information exchanger 903. Thereafter, when the adjacent cell updates its own CSP according to the request, the CSP updater 902 exchanges the updated CSP with the adjacent cell through the inter-cell information exchanger 903 and broadcasts the same through the signal transmitter 908 together with an adjacent cell identifier. Meanwhile, if a CSP update request message is received from the adjacent cell through the inter-cell information exchanger 903, the CSP updater 902 determines the possibility of the CSP update, transmits a CSP update ACK message or a CSP update NACK message, which indicates the possibility of CSP update, through the inter-cell information exchanger 903 to the adjacent cell, updates a CSP within a possible range, and transmits the updated CSP through the inter-cell information exchanger 903 to the adjacent cell. Herein, the CSP updater 902 may transmit its own cell identifier together with the updated CSP. Also, information regarding the application time of the updated CSP and the number of its own antennas may be transmitted together with the updated CSP. Herein, in the case of LTE, an application time of the updated CSP may be represented using an SFN.

For exchange of inter-cell information or messages with the BS 900, the inter-cell information exchanger 903 transmits a signal from the CSP updater 902 through an antenna to the adjacent cell and provides the CSP updater 902 with a signal received from the adjacent cell through an antenna.

The feedback information processor 904 receives a multi-cell CQI as feedback information from the UEs 910-1~910-N and outputs the received multi-cell CQI to the selector 906.

The selector 906 uses the multi-cell CQI from the UEs 910-1~910-N to allocate each resource a UE, to which data will be transmitted, and select TX parameters and a TX mode of the corresponding UE. The selector 906 outputs the selected TX mode and TX parameters to the signal transmitter 908. For example, the TX mode may be one of a Single User MIMO (SU-MIMO) mode such as Spatial Division Multiplexing (SDM) and a Multi User MIMO (MU-MIMO) mode such as Spatial Division Multiple Access (SDMA). Herein, the TX parameters may include a TX stream, a subchannel, a precoding vector, a rank, an MCS level and the like.

The signal transmitter 908 uses the selected TX mode and TX parameters to transmit data through an antenna. Also, the signal transmitter 908 transmits a CRS at each subframe.

Regarding each of the UEs 910-1~910-N, the signal receiver 912 receives a signal through one or more antennas and outputs the Received (RX) signal.

The channel estimator 914 receives a cell identifier of adjacent cells, which is transmitted by a serving BS through the signal receiver 912 and uses the cell identifier of the adjacent cells and the serving cell to extract a scrambling sequence allocated to each cell. Also, the channel estimator 914 receives a signal, which is transmitted by the serving cell and the adjacent cells, through the signal receiver 912, extracts a signal of the CRS-allocated resource from the RX signal, and descrambles the extracted signal by the allocated scrambling sequence to acquire a CRS signal of each cell. Thereafter, the channel estimator 914 uses the acquired CRS signal to determine a channel estimation value of each cell and outputs the determined channel estimation value to the feedback information generator 916.

The feedback information generator 916 receives a CSP of the adjacent cell and the serving cell from the serving BS through the signal receiver 912, uses the CSP of the adjacent cell and the serving cell to search a codebook of the adjacent cells and the serving cell corresponding to each time/frequency resource, and uses the channel estimation value of each cell to measure elements of the codebook searched for each cell, i.e., the multi-cell CQI corresponding to each precoding vector. Thereafter, the feedback information generator 916 generates the measured multi-cell CQI as feedback information and feeds back the same to the serving BS.

As described above, exemplary embodiments of the present invention adaptively update a CSP of each cell in a multi-cell MIMO system, exchange the updated CSP between cells and broadcast the exchanged inter-cell CSP, thereby effectively reducing the inter-cell interference of all the UEs in the cell by exchanging a small amount of information between the cells. Also, exemplary embodiments of the present invention, which include conventional scheduling complexity without using the inter-cell interference technique, have a very low scheduling complexity in comparison with other CoMP techniques. The reason for this is that a scheduling operation for each cell is performed independently, discrimination between a cell center UE and a cell edge UE is not necessary and discrimination between a low-mobility UE and a high-mobility UE is not necessary to apply the inter-cell interference reduction technology. Accordingly, the CSP is exchanged only when the CSP is updated. Thus, backhaul overhead is very low and is robust against backhaul latency, and the number of cells participating in BS coordination has no limit.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a serving base station (BS) in a multiple input multiple output (MIMO) system, the method comprising:
   determining at a serving BS whether there is a cell having an updated codebook subset pattern (CSP) among a serving cell and at least one adjacent cell, each of cells having the CSP being different from each other;
   transmitting, if it is determined that there is a cell having the updated CSP among the serving cell and the at least one adjacent cell, the updated CSP to an adjacent BS;
   acquiring a CSP of at least one cell serviced by the adjacent BS;
   transmitting the updated CSP and the acquired CSP and a reference signal for estimating a channel to at least one user equipment (UE) of the serving cell;
   receiving, from the UE, at least one multi-cell channel quality indicator (CQI) as a feedback determined by the UE based on information on an inter-cell interference; and
   performing downlink scheduling operation based on the multi-cell CQI,
   wherein the CSP comprises information on subsets of a codebook and a corresponding relationship between each subset and each time and frequency resource,
   wherein each of the subsets is used to precode data that is transmitted through a time and frequency resource corresponding to each of the subset,
   wherein each of the codebooks comprises an empty set or a set of one or more precoding vectors, and
   wherein the inter-cell interference is identified by the UE using codebooks included in the CSP of each cell and information on channels acquired from the reference signal of each cell.

2. The method of claim 1, further comprising:
   determining a ratio of a cell average throughput to a cell boundary throughput;
   comparing the determined ratio with a threshold value to generate a CSP update request message for requesting the adjacent cell to perform a CSP update;
   transmitting the generated CSP update request message to the adjacent cell; and
   receiving the updated CSP from the adjacent cell.

3. The method of claim 2, wherein the generating of the CSP update request message comprises:
   generating a CSP update request message for requesting the adjacent cell to increase an amount of subset codebook resources when it is determined that the ratio is greater than a first threshold value;
   generating a CSP update request message for requesting the adjacent cell to increase an amount of superset codebook resources when it is determined that the ratio is not greater than the first threshold value and is smaller than a second threshold value; and
   not generating a CSP update request message if it is determined that the ratio is not greater than the first threshold value and is not smaller than a second threshold value,
   wherein the first threshold value and the second threshold value vary according to at least one of an intra-cell user equipment (UE) distribution or a service type of a UE, the second threshold value being set to be smaller than the first threshold value.

4. The method of claim 2, further comprising:
   receiving a CSP update ACKnowledge (ACK)/Non-ACKnowledge (NACK) message for the request from the adjacent cell before receiving the updated CSP from the adjacent cell.

5. The method of claim 2, wherein at least one of the application time of the updated CSP or the number of antennas of the adjacent cell is received from the adjacent cell together with the updated CSP.

6. The method of claim 1, further comprising:
   updating a CSP when receiving a CSP update request message from an adjacent cell; and
   transmitting the updated CSP to the adjacent cell.

7. The method of claim 6, wherein the updating of the CSP comprises:
   determining, upon receiving a CSP update request message for requesting an increase in an amount of subset codebook resources from the adjacent cell, whether the cell average throughput is greater than a threshold value and updating the CSP by increasing the amount of subset codebook resources in the CSP when the cell average throughput is greater than the threshold value; and
   updating, upon receiving a CSP update request message for requesting an increase in an amount of superset codebook resources from the adjacent cell, the CSP by increasing the amount of superset codebook resources in the CSP,
   wherein the threshold value varies according to at least one of the intra-cell UE distribution or the service type of a UE.

8. The method of claim 6, further comprising:
   transmitting a CSP update ACKnowledge (ACK)/Non-ACKnowledge (NACK) message to the adjacent cell before transmitting the updated CSP to the adjacent cell.

9. The method of claim 6, wherein at least one of the application time of the updated CSP or the number of antennas of the adjacent cell is transmitted to the adjacent cell together with the updated CSP.

10. The method of claim 1, further comprising:
    using the received multi-cell CQI to allocate each resource to an intra-cell UE, which is to receive data, and to select a transmission (TX) parameter and a TX mode of the intra-cell UE; and
    transmitting data by using the selected TX mode and TX parameter.

11. An apparatus for operating a base station (BS) in a multiple input multiple output (MIMO) system, the apparatus comprising:
    a processor configured to determine whether there is a cell having an updated CSP among a serving cell and at least one adjacent cell, each cell having the CSP being different from each other;
    a transceiver configured to:
      transmit the updated CSP to an adjacent BS next to the serving BS, if it is determined that there is a cell having the updated CSP among the serving cell and the at least one adjacent cell,
      receive a CSP of at least one cell serviced by the adjacent BS,
      transmit the updated CSP and the acquired CSP and a reference signal for estimating a channel to at least one user equipment (UE) of the serving cell, and receive, from the at least one UE, at least one multi-cell channel quality indicator (CQI) as a feedback determined by the UE based on information on an inter-cell interference, wherein the processor is further configured to perform downlink scheduling operation based on the multi-cell CQI, wherein the CSP comprises information on subsets of a codebook and a corresponding relationship between each subset and each time and frequency resource, wherein each of the subsets is used to precode data that is transmitted through a time and frequency resource corresponding to each of the subset, wherein each of the codebooks comprises an empty set or a set of one or more precoding vectors, and wherein the inter-cell interference is identified by the UE using codebooks included in the CSP of each cell and information on channels acquired from the reference signal of each cell.

12. The apparatus of claim 11,
wherein the processor is further configured to:
  determine a ratio of a cell average throughput to a cell boundary throughput, and
  compare the determined ratio with a threshold value to generate a CSP update request message for requesting the adjacent cell to perform a CSP update,
wherein the transceiver is further configured to:
  transmit the generated CSP update request message to the adjacent cell, and
  receive the updated CSP from the adjacent cell.

13. The apparatus of claim 12, wherein the processor is further configured to:
  generate a CSP update request message for requesting the adjacent cell to increase the amount of subset codebook resources if it is determined that the ratio is greater than a first threshold value;
  generate a CSP update request message for requesting the adjacent cell to increase the amount of superset codebook resources if it is determined that the ratio is not greater than the first threshold value and is smaller than a second threshold value; and
  generate a CSP update request message if it is determined that the ratio is not greater than the first threshold value and is not smaller than a second threshold value,
  wherein the first threshold value and the second threshold value vary according to at least one of an intra-cell user equipment (UE) distribution or a service type of a UE, the second threshold value being set to be smaller than the first threshold value.

14. The apparatus of claim 12, wherein the transceiver is further configured to receive a CSP update ACKnowledge (ACK)/Non-ACKnowledge (NACK) message for the request from the adjacent cell before receiving the updated CSP from the adjacent cell.

15. The apparatus of claim 12, wherein the information exchanger transceiver is further configured to receive at least one of the application time of the updated CSP or the number of antennas of the adjacent cell from the adjacent cell together with the updated CSP.

16. The apparatus of claim 11,
wherein the processor is further configured to update a CSP when receiving a CSP update request message from an adjacent cell, and
wherein the transceiver is further configured to transmit the updated CSP to the adjacent cell.

17. The apparatus of claim 16, wherein the processor is further configured to:
  determine whether the cell average throughput is greater than a threshold value upon receiving a CSP update request message for requesting an increase in an amount of subset codebook resources from the adjacent cells;
  update the CSP by increasing the amount of subset codebook resources in the CSP if it is determined that the cell average throughput is greater than the threshold value; and
  update the CSP by increasing an amount of superset codebook resources in the CSP upon receiving a CSP update request message for requesting an increase in the amount of superset codebook resources from the adjacent cell,
wherein the threshold value varies according to at least one of an intra-cell UE distribution or a service type of a UE.

18. The apparatus of claim 16, wherein the transceiver is further configured to transmit a CSP update ACKnowledge (ACK)/Non-ACKnowledge (NACK) message to the adjacent cell before transmitting the updated CSP to the adjacent cell.

19. The apparatus of claim 16, wherein the transceiver is further configured to transmit at least one of the application time of the updated CSP or the number of antennas of the adjacent cell to the adjacent cell together with the updated CSP.

20. The apparatus of claim 11,
wherein the processor is further configured to:
  use the received multi-cell CQI to allocate each resource to an intra-cell UE, which is to receive data, and
  select a transmission (TX) parameter and a TX mode of the intra-cell UE, and
wherein the transceiver is further configured to:
  transmit a reference signal to a UE, and
  transmit data by using the selected TX mode and TX parameter.

21. A method for operating a user equipment (UE) in a multiple input multiple output (MIMO) system, the method comprising:
  receiving a codebook subset pattern (CSP) of each of a plurality of cells from a serving base station (BS);
  receiving a reference signal for estimating a channel from each plurality of cells;
  determining a multi-cell channel quality indicator (CQI) based on an inter-cell interference that is identified by using codebooks included in the received CSP and information on channels acquired from the reference signal of each plurality of cells;
  transmitting the determined multi-cell CQI to the serving base station as a feedback; and
  receiving data, from the serving BS, according to the downlink scheduling performed by the serving BS based on the multi-cell CQI,
wherein each plurality of cells has the CSP being different from each other,
wherein the CSP comprises information on subsets of a codebook and a corresponding relationship between each subset and each time and frequency resource,
wherein each of the subsets is used to precode data that is transmitted through a time and frequency resource corresponding to each of the subset, and
wherein each of the codebooks comprises an empty set or a set of one or more precoding vectors.

22. An apparatus for operating a user equipment (UE) in a multiple input multiple output (MIMO) system, the apparatus comprising:
  a transceiver configured to receive a codebook subset pattern (CSP) of each of a plurality of cells from a serving base station (BS) and to receive a reference signal for estimating a channel from each plurality of cells; and a processor configured to determine a multi-cell channel quality indicator (CQI) based on an inter-cell interference that is identified by using codebooks included in the received CSP and information on channels acquired from the reference signal of each plurality of cells, wherein the transceiver is further configured to
transmit the determined multi-cell CQI as a feedback to the serving base station, and
receive data, from the serving BS, according to the downlink scheduling performed by the serving BS based on the multi-cell CQI, wherein each of the plurality of cells has the CSP being different from each other, wherein the CSP comprises information on subsets of a codebook and a corresponding relationship between each subset and each time and frequency resource, wherein each of the subsets is used to precode data that is transmitted through a time and frequency resource corresponding to each of the subset, and wherein each of the codebooks comprises an empty set or a set of one or more precoding vectors.

* * * * *